United States Patent [19]

Tuchida et al.

[11] Patent Number: 5,534,955
[45] Date of Patent: Jul. 9, 1996

[54] REFLECTION TYPE PROJECTOR

[75] Inventors: Michiro Tuchida, Kanagawa; Masaaki Nomura, Saitama; Soichiro Kimura, Saitama; Ko Aosaki, Saitama; Tatsuo Kitami, Kanagawa, all of Japan

[73] Assignee: Fuji Photo Film Co., Ltd., Kanagawa, Japan

[21] Appl. No.: 424,635

[22] Filed: Apr. 19, 1995

[30] Foreign Application Priority Data

Apr. 21, 1994 [JP] Japan .................................. 6-083462
May 16, 1994 [JP] Japan .................................. 6-101268

[51] Int. Cl.$^6$ .................................................. G03B 21/00
[52] U.S. Cl. ........................ 353/66; 353/88; 353/DIG. 3
[58] Field of Search ................................ 353/38, DIG. 3, 353/DIG. 4, 97, 88, 63, 64, 65, 66

[56] References Cited

U.S. PATENT DOCUMENTS 3,619,048 11/1971 Engert ...................... 353/66
3,837,739 9/1974 Altman ...................... 353/66
4,979,813 12/1990 Koga et al. ............. 353/DIG. 4
5,325,137 6/1994 Konno et al. .......... 353/DIG. 3

FOREIGN PATENT DOCUMENTS 4-155323 5/1992 Japan .
6-18504 4/1994 Japan ...................... 353/63
6-48503 12/1994 Japan .

Primary Examiner—William C. Dowling
Attorney, Agent, or Firm—Young & Thompson

[57] ABSTRACT

A reflection prevention film coats a backside of a stage glass by a vacuum evaporation and coating, etc. A light from a metal halide lamp is not reflected on the back of the stage glass by the reflection preventing film, and is transmitted through the stage glass and is reflected on a surface of the stage glass and a transparent manuscript. The light reflected on the surface of the stage glass and the transparent manuscript enters a projection lens unit and appears as a spot light on a screen, but because the light is not reflected on the backside of the stage glass, so that the amount of the light, which causes the spot light, can be reduced. As a result, the spot light on the screen is inconspicuous.

11 Claims, 10 Drawing Sheets

FIG.6

| SAMPLE NO. \ CONDITION | A<br>SURFACE REFLECTION FRESNEL +HARD COAT | B<br>SURFACE REFLECTION FRESNEL +PROTECTION GLASS | C<br>SURFACE REFLECTION FRESNEL +PROTECTION GLASS (REFLECTION PREVENTING FILM) | D<br>BACK REFLECTION FRESNEL |
|---|---|---|---|---|
| PRIME GLASS | 40±10% | 55±10% | 45±10% | 45±10% |
| BACK NON-REFLECTION COATING | 25± 5% | 30± 5% | 25± 5% | 25± 5% |
| BOTH SIDES NON-REFLECTION COATING | 20± 5% | 20± 5% | 20± 5% | 20± 5% |
| TRANSMISSION FRESNEL | 25± 5% | 30± 5% | 25± 5% | 25± 5% |

REFLECTION TYPE PROJECTOR

BACKGROUND OF THE INVENTION

1. Field of the Invention

The present invention relates to a reflection type projector and more particularly to a reflection type projector which stores in its housing a light source lamp, a reflecting mirror, a projection lens and the like which comprise a reflection head.

2. Description of the Related Art

Conventionally, this kind of the reflection type projector is represented by Japanese Patent Coating Laid-Open No. 4-155323 and others. A light from a light source lamp of the reflection type projector is reflected by a reflection mirror and is transmitted through a stage glass 1, a transparent manuscript 2, and a protective glass 3 of FIG. 12 to enter a reflection Fresnel lens 4. Then, the light entering the reflection Fresnel lens 4 is reflected by a reflection layer 4A of the reflection Fresnel lens 4 and is converged on a Fresnel surface 4A to illuminate the transparent manuscript 2 from the back side and project an image on the transparent manuscript 2. And, a reflection light of the image is transmitted through the stage glass 1, and then is projected toward the projection lens by the reflection mirror. As a result, the recorded image of the transparent manuscript is enlarged and projected on a screen by the projection lens.

The reflection Fresnel lens 4 is normally attached at the back of a cover, and it can be opened and closed together with the cover against a stage surface of the housing. It is closed and locked when the reflection type projector is carried, and its lock is released when it is used. And, it can be opened and closed when the transparent manuscript is replaced. In the conventional reflection type projector, the power source has to be cut of when the cover is opened because the light from the light source is blinding, and it has to be turned on after the cover is closed so that the projector can be comfortably used.

SUMMARY OF THE INVENTION

However, the conventional reflection type projector has a disadvantage in that a spot light, which is brighter than the other parts, appears at the center of the transparent manuscript's image which is projected on the screen.

And, the conventional reflection type projector has another disadvantage in that because the power source of a light source is turned on/off every time the manuscript is replaced, if a metal halide lamp, for example, is used as a light source, the lamp can only be used for a short time and easily breaks because of the characteristic of the lamp.

The present invention has been developed in view of the above-described circumstances and has as its aim the provision of the reflection type projector which can make the spot light which appears on the screen inconspicuous and which can cut off the light from the light source without electrically turning on/off the power source of the light source when the reflection Fresnel lens is opened and can illuminate the transparent manuscript when the reflection Fresnel lens is closed.

To achieve the above-described object, in the reflection type projector according to the present invention comprising a housing wherein an opening formed on the upper surface thereof is covered with a light-transmission plate and a stage surface is formed on which the transparent manuscript is placed, a reflection Fresnel lens which is provided in the housing in a manner to overlap the light-transmission plate and holds the transparent manuscript between the stage surface and itself, a projection lens provided on the side surface of the housing, a light source for illuminating the transparent manuscript, and a reflection mirror which reflects the reflection light of the transparent manuscript illuminated by the light source toward the projection lens, a light band cutting means which cuts off a light band which is reflected before reaching the reflection Fresnel lens and enters the projection lens is provided.

To achieve the above-described object, in the reflection type projector comprising a housing which covers the opening formed on the upper surface thereof with a light-transmission plate and forms the stage surface on which the transparent manuscript is placed, the reflection Fresnel lens which is provided in the housing in such a manner to hold the transparent manuscript between the stage glass and itself, the projection lens provided on the side surface of the housing, the light source for giving the reflection light to the transparent manuscript, and the reflection mirror which reflects the reflection light of the transparent manuscript illuminated by the light source toward the projection lens, a cutting means is provided for cutting off the center of the light band from the light source.

To achieve the above-described object, in the reflection type projector according to the present invention which comprises a housing wherein an opening formed on the upper surface thereof is covered with a light-transmission plate and a stage surface is formed on which the transparent manuscript is placed, a reflection Fresnel lens which is provided in the housing in a manner to overlap the light-transmission plate and holds the transparent manuscript between the stage surface and itself, a projection lens provided on the side surface of the housing, a light source for illuminating the transparent manuscript, and a reflection mirror which reflects the reflection light of the transparent manuscript illuminated by the light source toward the projection lens, provided are a shutter member which is arranged in such a manner to move forward and backward against the optical axis of the light from the light source and cuts off the light given to the transparent manuscript from the light source by advancing onto the optical axis, a sensor which detects whether the reflection Fresnel lens is opened or closed, and a drive means which moves the shutter member onto the optical axis of the light from the light source on the basis of the information from the sensor that the reflection Fresnel lens is opened and retracts the shutter member from the optical axis in accordance with the information from the sensor that the reflection Fresnel lens is closed.

The reflection type projector of claim 2 is provided with a light band cutting means for cutting off the spot light caused by the light band, which is reflected before reaching the reflection Fresnel lens, among the light band from the light source, so that the amount of the light band which causes the spot light can be reduced. As a result, the spot light appearing on the screen can be inconspicuous.

In the reflection type projector of claim 3, the reflection preventing film is coated on the backside and surface of the stage glass, so there is no reflection light on the stage glass.

In the reflection type projector of claim 4, the reflection Fresnel lens is arranged in such a manner to face the transparent manuscript side, and the Fresnel surface is coated hard to be protected. As a result, a protective glass for the Fresnel lens is not required, therefore, there is no light reflected by the protective glass, so the amount of the light band, which causes the spot light, can be reduced.

In the reflection type projector of claim 5, the Fresnel surface of the reflection Fresnel lens is covered with the protective glass, and the reflection preventing film coats the surface and/or backside of the transparent manuscript side of the protective glass, so that the reflection light on the protective glass can be eliminated.

In the reflection type projector of claim 6, the reflection Fresnel lens is arranged in such a manner that the Fresnel surface faces the opposite side to the transparent manuscript side. As a result, the protective glass for the Fresnel surface is not required, therefore, there is no light reflected by the protective glass, so the light amount of the light band, which causes the spot light, can be reduced.

In the reflection type projector of claim 7, the reflection preventing film coats the surface opposite to the Fresnel surface of the reflection Fresnel lens, so there is no light reflected by the surface opposite to the Fresnel surface.

In the reflection type projector of claim 8, an irregular portion is formed at the center of the backside of the stage surface, and the light of a light source image is diffused by the irregular portion. As a result, the light amount of the light source image entering the projection lens is reduced, so the spot light appearing on the screen can be inconspicuous.

In the reflection type projector of claim 9, a light-shielding member is provided at a position where the light band from the light source does not overlap each other, and shields the light band which is reflected before reaching the reflection Fresnel lens and enters the projection lens. As a result, the light amount of the light band which is the cause of the spot light decreases, so that the spot light appearing on the screen can be inconspicuous.

In the reflection type projector of claim 10, the center of the light band which travels from the light source toward the reflection mirror is cut off by a cutting means. As a result, the light amount of the light band which is the cause of the spot light is reduced, so the spot light appearing on the screen can be inconspicuous.

In the reflection type projector of claim 11, cutting means of claim 10 is made of the light-shielding member, and provides the light-shielding member is provided at a position near the light source between the light source and the reflection mirror. As a result, the light band which is reflected before reaching the reflection Fresnel lens and enters the projection lens is reduced, so the spot light appearing on the screen can be inconspicuous.

In the reflection type projector of claim 12, when the reflection Fresnel lens is opened from the stage surface, the information that the reflection Fresnel lens is opened is transmitted from the sensor to the drive means, and the drive means advances the shutter member onto the optical axis of the light source on the basis of the information. As a result, the projection light from the light source is cut off by the shutter member, so it is not necessary to cut off the power source of the light source when the reflection Fresnel lens is opened. And, when the reflection Fresnel lens is closed on the stage surface, the information that the reflection Fresnel lens is closed is transmitted from the sensor to the drive means, and the drive means retracts the shutter member from the optical axis of the light source on the basis of the information. As a result, when the reflection Fresnel lens is closed, the reflection light from the light source, which is completely lighted, can be given to the transparent manuscript.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIG. 6 is a view comparing how much spot light is reduced;

DESCRIPTION OF THE PREFERRED EMBODIMENT

Detailed description will hereunder be given of the preferred embodiment of a reflection type projector according to the present invention with reference to the accompanying drawings.

Figure 1:
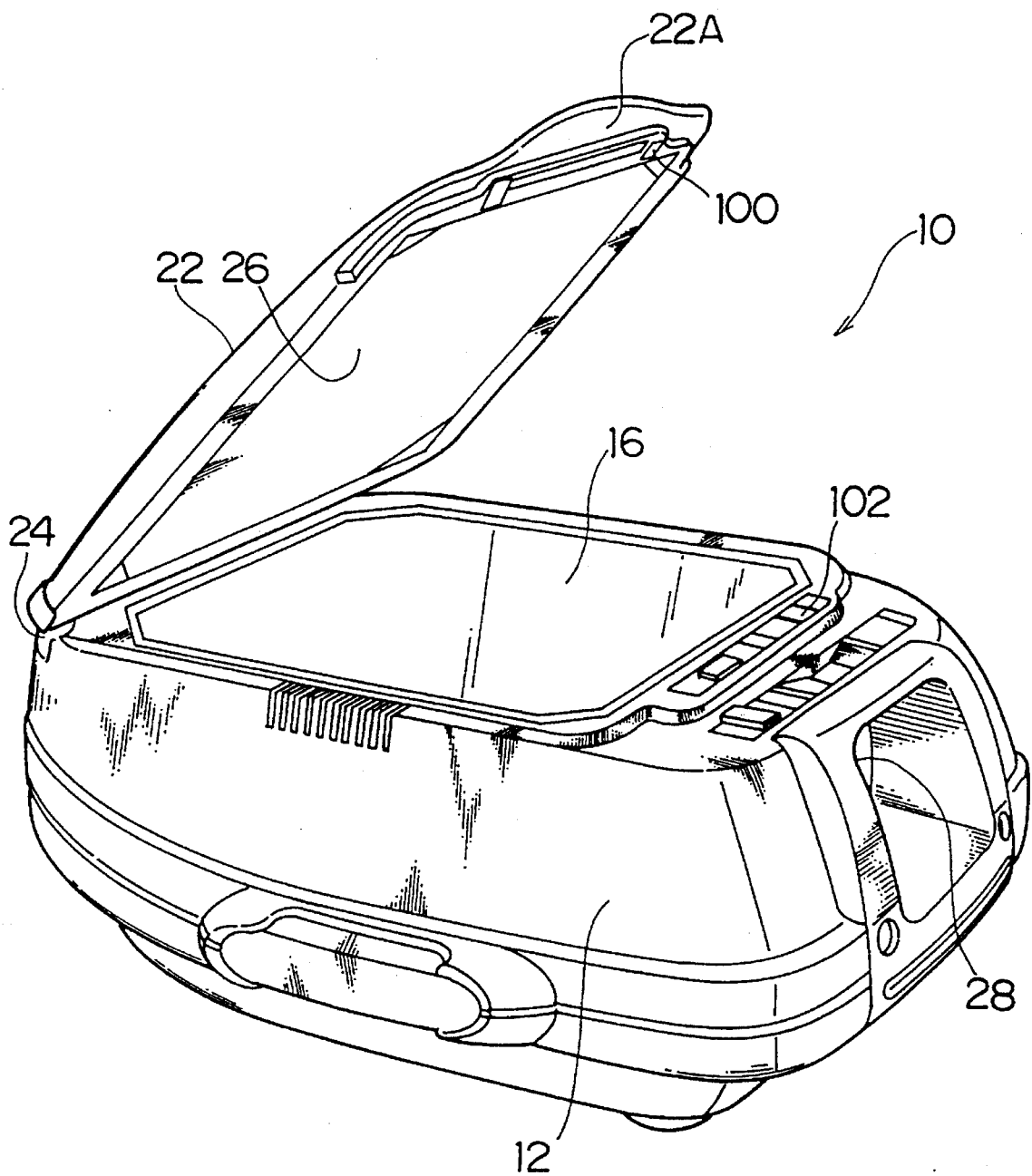
FIG. 1 is a perspective view illustrating an embodiment of the reflection type projector according to the present invention.
Figure 2:
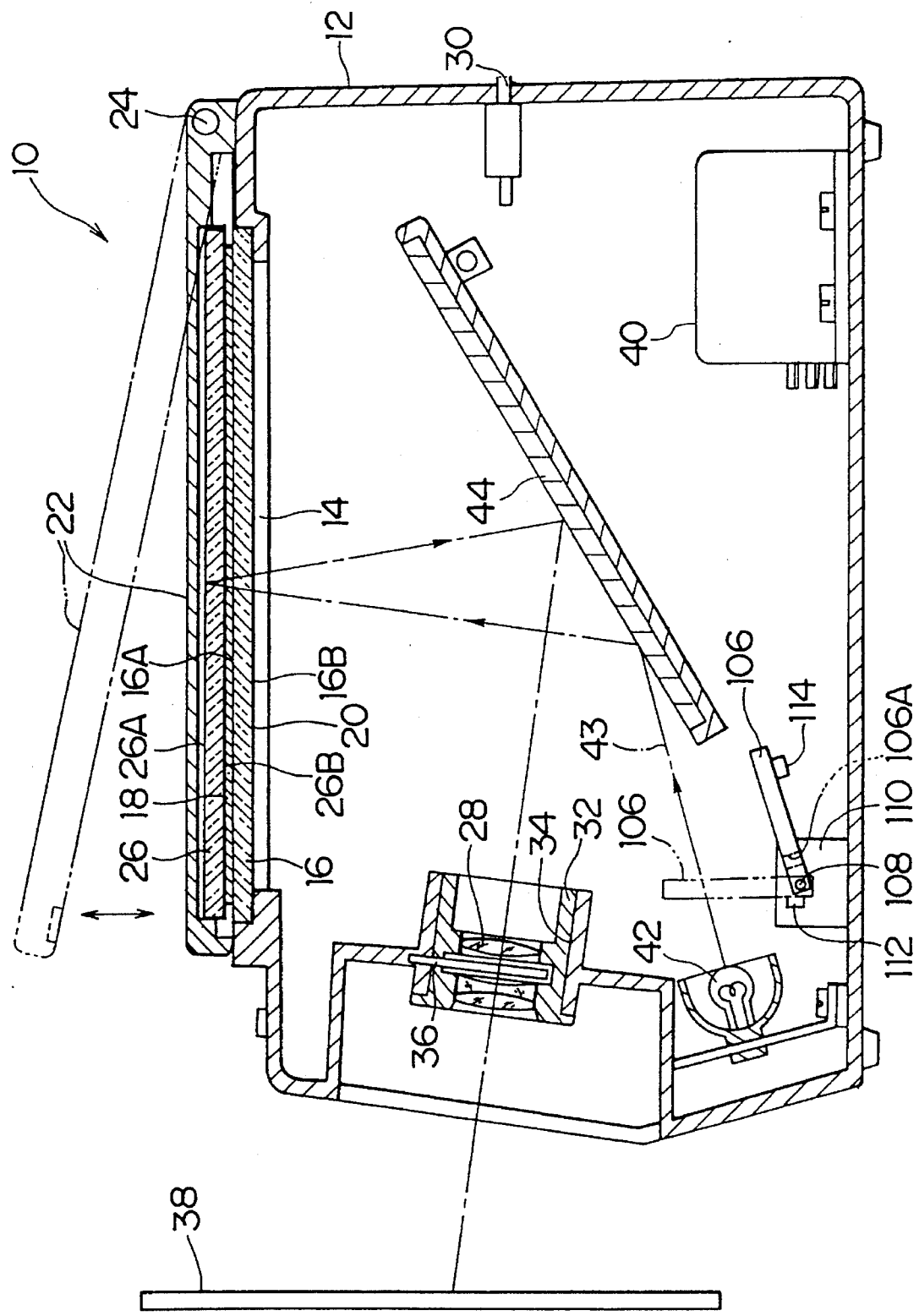
FIG. 2 is a sectional view of the reflection type projector according to the present invention.

FIG. 1 is a perspective view illustrating an embodiment of the reflection type projector according to the present invention, and FIG. 2 is a sectional view of the reflection type projector. An aperture 14 for a stage is formed on the upper surface of a housing 12 of the reflection type projector 10, and a stage glass 16 is secured in the aperture 14 and is substantially flush with the upper surface of the housing 12. A transparent manuscript 18, in which an image is printed on a transparent sheet thereof, is placed on a surface 16A of the stage glass 16 in such a manner that the printed surface faces downward. And, as shown in FIG. 2, a reflection preventing film 20 coats in plural layers a back 16B of the stage glass 16 by methods of vacuum evaporation and coating, etc.

A manuscript cover 22 is provided on the upper side of the housing 12, and it is attached by a hinge 24 provided on the upper edge of the housing 12 in such a manner that it can open and close against the stage glass 16. And, a magnet 100 is fixed in the vicinity of a grip 22A of the manuscript cover 22 shown in FIG. 1. When the manuscript cover 22 is closed, the magnet 100 adsorbs with a magnetic plate 102 such as an iron plate, etc. which is fixed on the upper surface of the housing 12. When the magnet 100 adsorbs with the magnet adsorption 102, a relay 104 (refer to FIG. 10) starts working. The relay 104 will be described later.

As shown in FIG. 2, a reflection Fresnel lens 26 is provided in the manuscript cover 22, and a reflection layer 26A is formed on the back side of a reflection Fresnel lens 26. When the manuscript cover 22 is closed, a Fresnel surface 26B of the reflection Fresnel lens 26 overlaps the stage glass 16. As a result, the transparent manuscript 18, which is placed on the stage glass 16, is held between the surface 16A of the stage glass 16 and the Fresnel surface 26B of the reflection Fresnel lens 26. And, the Fresnel surface 26B is hard-coated to be protected.

A projection lens unit 28 and a switch 30 of a light source lamp is provided on the side wall of the housing 12. In the projection lens unit 28, plural lenses are housed in a camera cone 32, and the camera cone 32 is secured to an aperture 34 formed on the front surface of the housing 12. And, a variable diaphragm 36 is provided in the projection lens unit 28, and the brightness of the image projected on the screen 38 can be adjusted by changing the size of an aperture of the variable diaphragm 36.

In the housing 12, a power source unit 40, a metal halide lamp 42 as a light source lamp, a reflection mirror 44 and a shutter plate 106 are provided. The reflection mirror 44 illuminates the reflection Fresnel lens 26 by reflecting the light from the metal halide lamp 42, and is inclined and fixed at a position where it reflects the projection light of the transparent manuscript 18 reflected by the reflection Fresnel lens 26 toward the projection lens unit 28. The shutter plate 106 will be described later.

Next, an explanation will be given of the operation of the reflection type projector constructed in the above-mentioned manner. First, the reflection type projector 10 is arranged in such a manner that a taking lens unit 28 faces the screen 38, and the transparent manuscript 18 is placed on the stage glass 16 with the manuscript cover 22 upwardly opened. Then, the manuscript cover 22 is closed, and the transparent manuscript 18 is held between the stage glass 16 and the reflection Fresnel lens 26. Next, with the switch 30 on, the metal halide lamp 42 is lighted. The light from the metal halide lamp 42 is reflected toward the stage glass 16 by the reflection mirror 44, and is transmitted through the stage glass 16 and the transparent manuscript 18 to enter the reflection Fresnel lens 26.

The light entering the reflection Fresnel lens 26 is reflected by the reflection layer 26A of the reflection Fresnel lens 26, and then is converged on the Fresnel surface 26B to illuminate the transparent manuscript 18 from the back side and reflect the recorded image. The reflection light of the image on the transparent manuscript 18 is transmitted through the stage glass 16 and then is reflected by the reflection mirror 44 toward the projection lens unit 28. As a result, the image is enlarged and projected on the screen 38 by the projection lens unit 28.

Figure 3:
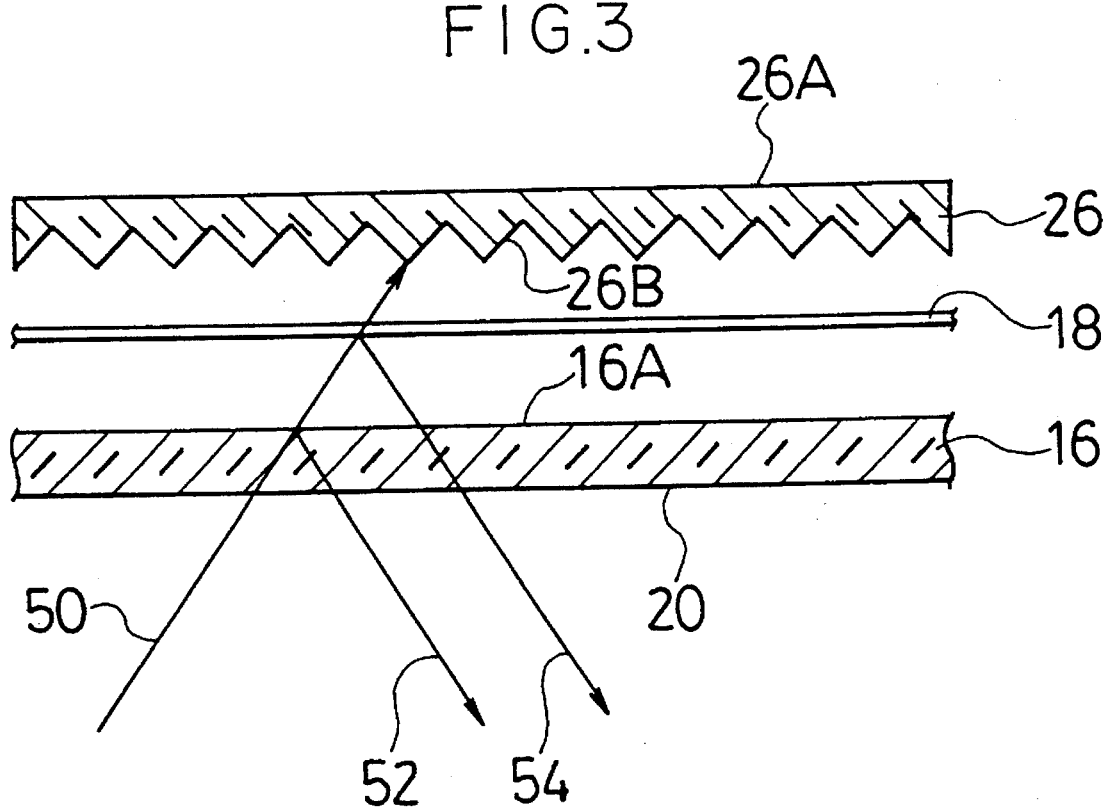
FIG. 3 is an explanatory view illustrating the light of a metal halide lamp in the case when the reflection preventing film coats the backside of a stage glass.

Here, as shown in FIG. 3, the reflection preventing film 20 coats the back 16B of the stage glass 16. By the reflection preventing film 20, a light 50 of the metal halide lamp 42 is not reflected on the back 16B of the stage glass 16, and is transmitted through the stage glass 16 and reflected on the surface 16A of the stage glass 16 and the transparent manuscript 18. The light 52 and 54 reflected on the surface 16A of the stage glass 16 and the transparent manuscript 18 enters the projection lens unit 28 and appears as the spot light on the screen 38. In this embodiment, the amount of the light, which causes the spot light, is small compared to the conventional reflection type projector wherein the light is reflected on the back of the stage glass. As a result, the spot light appearing on the screen 38 is inconspicuous.

And, in FIG. 3, the explanation was given of the case that the reflection preventing film 20 only coats the stage glass 16 and the back 16B, but the present invention is not limited to this. The reflection preventing film 20 additionally coats the surface 16A of the stage glass 16, too. Thus, the amount of the light reflected on the surface 16A which causes the spot light is decreased, so that the spot light can be inconspicuous.

Figure 11:
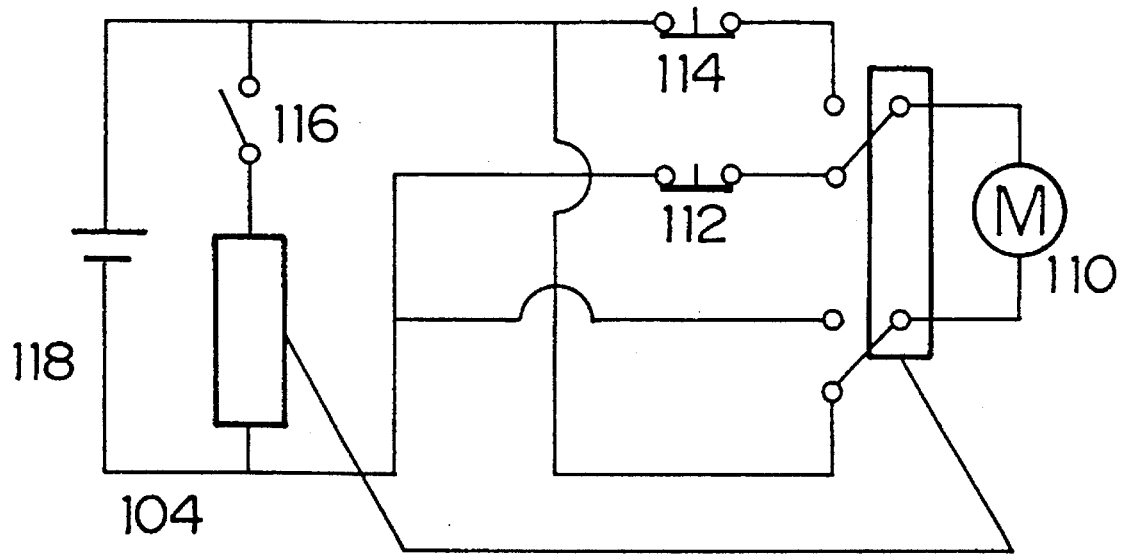
FIG. 11 is an explanatory view illustrating an explanatory view illustrating the drive circuit of the shutter plate in the case when the shutter plate advances onto the optical axis of the light from the metal halide lamp; and, FIG. 12 is a development illustrating the reflection light of the conventional reflection type projector.
Figure 12:
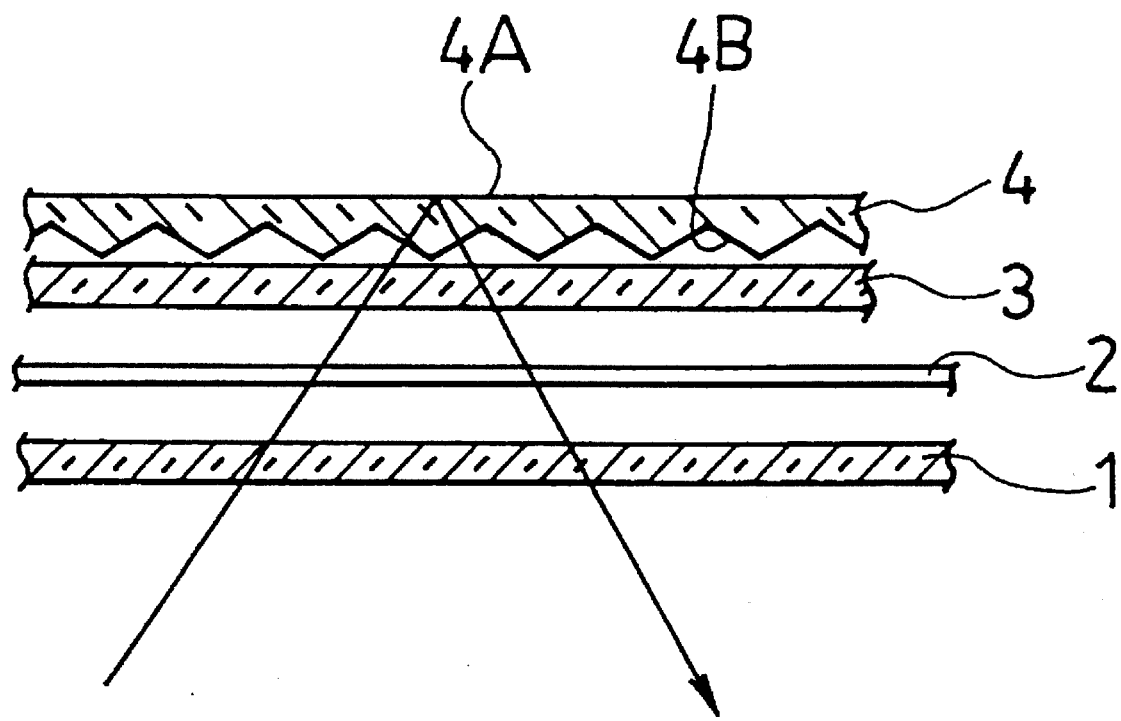

Furthermore, in this embodiment, because the Fresnel surface 26B of the reflection Fresnel lens 26 is hard-coated to be protected, a conventionally-used protective glass 3 (refer to FIG. 11) is not required. Therefore, the amount of the light reflected on the protective glass 3 is small, so that the amount of the light band, which causes the spot light, can be reduced.

And, when the reflection Fresnel lens 26 is arranged in such a manner that the Fresnel surface 26B faces opposite to the transparent manuscript 18, the protective glass 3 is not required, so the amount of the light band, which causes the spot light, can be reduced. In this case, if the reflection preventing film coats the surface opposite to the Fresnel surface 26B, there is no reflection light from the surface.

Figure 4:
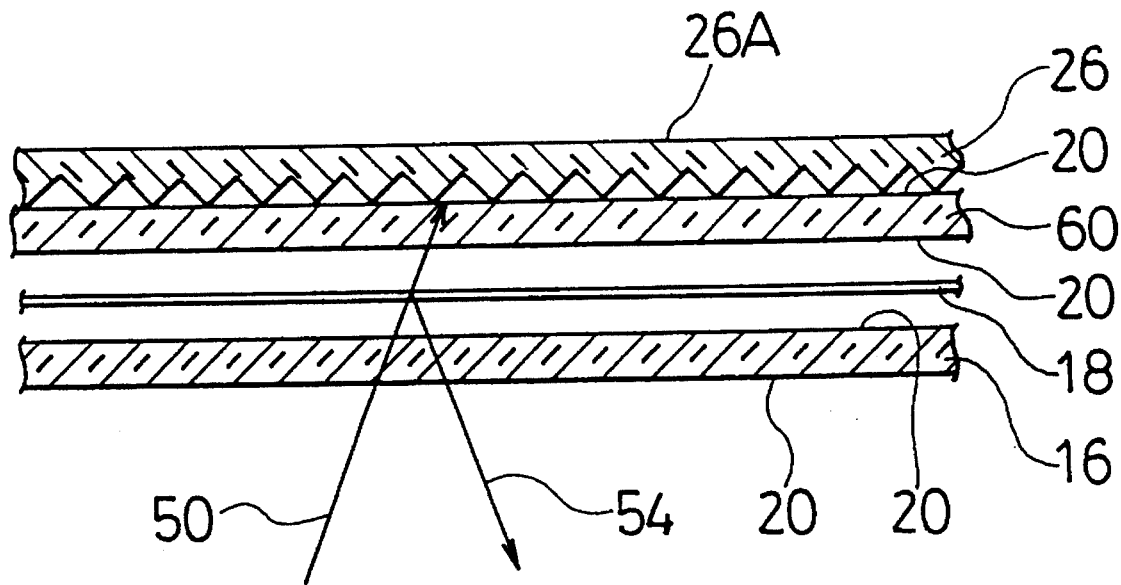
FIG. 4 is an explanatory view illustrating the light of the metal halide lamp in the case when the reflection preventing film coats the surface and the backside of the protective glass.

FIG. 4 is a sectional view illustrating the second embodiment of the reflection type projector according to the present invention, and a protective glass 60 is fixed on the surface at the transparent manuscript 18 side of the reflection Fresnel lens 26. The reflection preventing film 20 coats both sides of the protective glass 60, and the reflection protecting film 20 also coats both sides of the stage glass 16. According to the second embodiment, the light, which is a cause of the spot light, is only the light 54 reflected on the transparent manuscript 18, so that the spot light can be inconspicuous.

Figure 5:
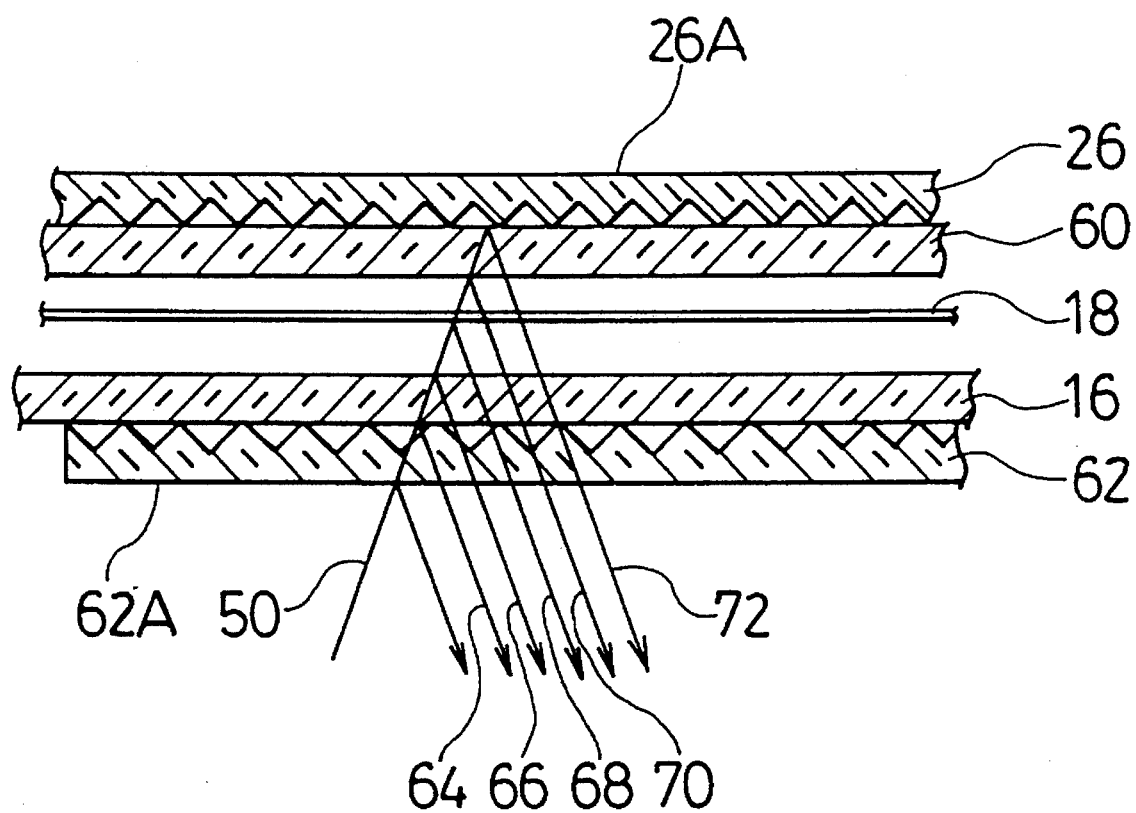
FIG. 5 is an explanatory view illustrating the light of the metal halide lamp in the case when a transmission Fresnel lens is secured to the back of the stage glass.

FIG. 5 is a sectional view illustrating the third embodiment of the reflection type projector, and a protective glass 60 is secured to the reflection Fresnel lens 26 and a transmission Fresnel lens 62 is fixed on the back of the stage glass 16. In the third embodiment, the reflection preventing film is not coated on the stage glass 16 and the protective glass 60 described in the third embodiment, so the light 50 from the metal halide lamp 42 is reflected on the back 62A of the transmission Fresnel lens 62, both sides of the stage glass 16, the transparent manuscript 18, and both sides of a protective glass 60.

Here, the light 64–72, which has been reflected on the both sides of the stage glass 16, the transparent manuscript 18 and the protective glass 60, is transmitted through the transmission Fresnel lens 62, so an image-forming position of the metal halide lamp 42 is positioned at the projection lens unit 28 side compared to the conventional reflection type projector which does not use the reflection Fresnel lens 62, because of the function of the two convex lenses, that is, the reflection Fresnel lens 62 and the projection lens unit 28. As a result, since the area of the spot light appearing on the screen 38 is larger than that of the conventional reflection type projector, that is, the spot light's amount in the area of the spot light is decreased, so the spot light on the screen is inconspicuous.

FIG. 6 shows the results of experiments on the change of the spot light's amount in each case of sixteen combinations, wherein a stage glass made of a prime glass (Sample 1), a stage glass (Sample 2) of which backside is coated by the reflection preventing film, a stage glass (Sample 3) of which both sides are coated by the reflection preventing film, and a stage glass made of a prime glass (Sample 4), to which the transmission Fresnel lens is secured, are used in the case that a surface reflection Fresnel lens is hard-coated (Condition A), a protective glass is secured to a protective glass (Condition B), a protective glass coated with a reflection preventing film is secured to a surface reflection Fresnel lens (Condition C), and a back reflection Fresnel lens is used (Condition D). In this experiment, a light amount $\alpha$ at the center part of the spot light appearing on the screen is compared with a light amount $\beta$ 10 cm away from the center part of the spot light, and it was discovered that when the rate of increase $(\alpha-\beta)\beta$ of the spot light's amount is more than 35%, the spot light is conspicuous.

According to FIG. 6, when the stage glass of Sample 1 is used, the spot light is conspicuous in all of A~D conditions. And, when the stage glass of Sample 2 (refer to FIG. 3) is used, the spot light is inconspicuous in all of A~D conditions. Furthermore, the stage glass of Sample 3 (refer to FIG. 4) and the stage glass (refer to FIG. 5) are used, the spot light is inconspicuous in all of A~D conditions.

In this experiment, because the metal halide lamp having a high illuminance is used as the light source lamp, the spot light is conspicuous compared to a halogen lamp having a low illuminance. Accordingly, when the halogen lamp is used as the light source lamp, the light amount at the center of the spot light is small and the spot light is inconspicuous, even if the rate of increase of the spot light's amount is approximately 40%.

Figure 7:
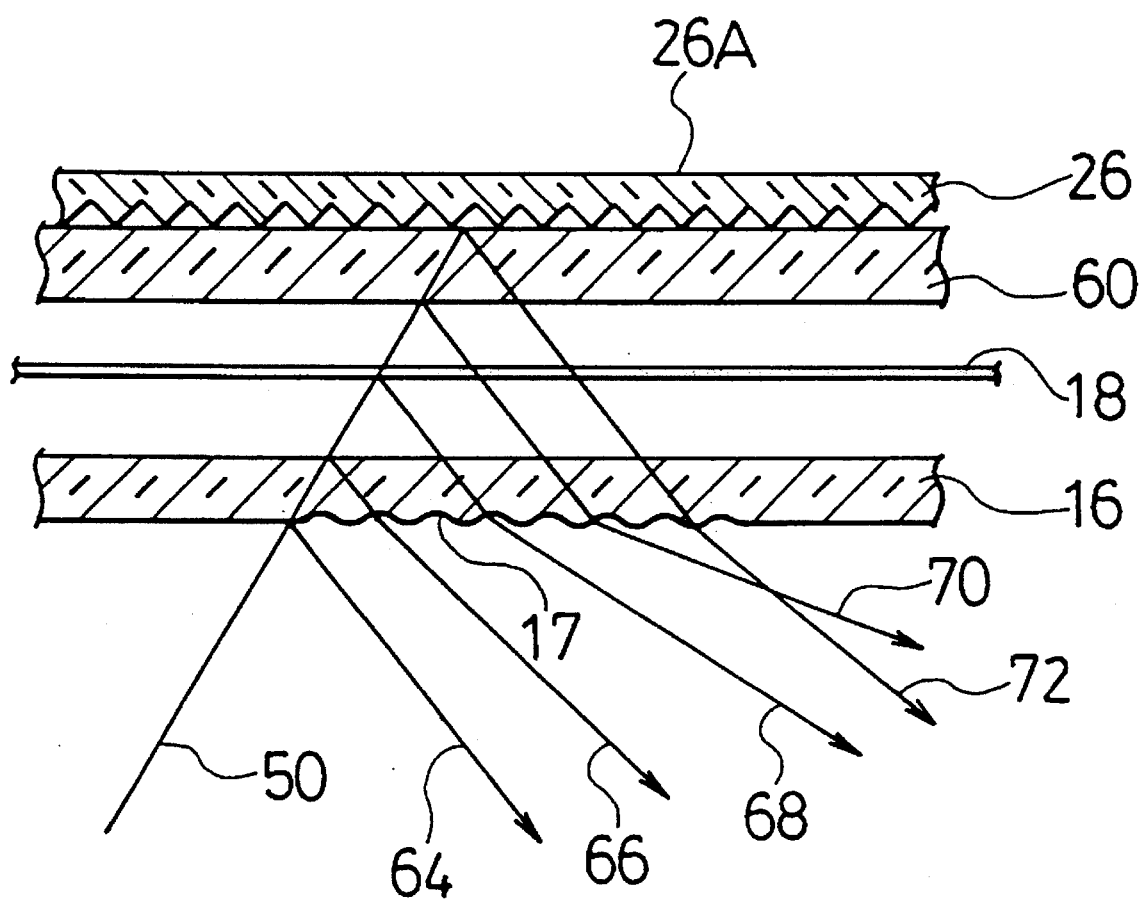
FIG. 7 is an explanatory view illustrating the light of the metal halide lamp in the case when the grinding surface is formed at the center of the back of the stage glass.

FIG. 7 is a sectional view illustrating the forth embodiment of the reflection type projector according to the present invention, and a irregular surface 17 is formed at the center part of the backside of the stage glass 16. In the forth embodiment, the reflection preventing film is not coated on the stage glass 16 and the protective glass 60, so the light 50 from the metal halide lamp 42 is reflected on the both sides of the stage glass 16, the transparent manuscript 18, and the both sides of the protective glass 60 as shown with an arrow in FIG. 7.

Here, the light 64–72, which has been reflected on the both sides of the stage glass 16, the transparent manuscript 18 and the both sides of the protective glass 60, is diffused by the irregular surface 17 of the stage glass 16 and radiated toward outside the projection lens unit 28. As a result, the light amount of the light 64–72 entering the projection lens unit 28 decreases, so the spot light can be inconspicuous. The irregular surface 17 can be formed by grinding or etching the stage glass 16.

Figure 8:
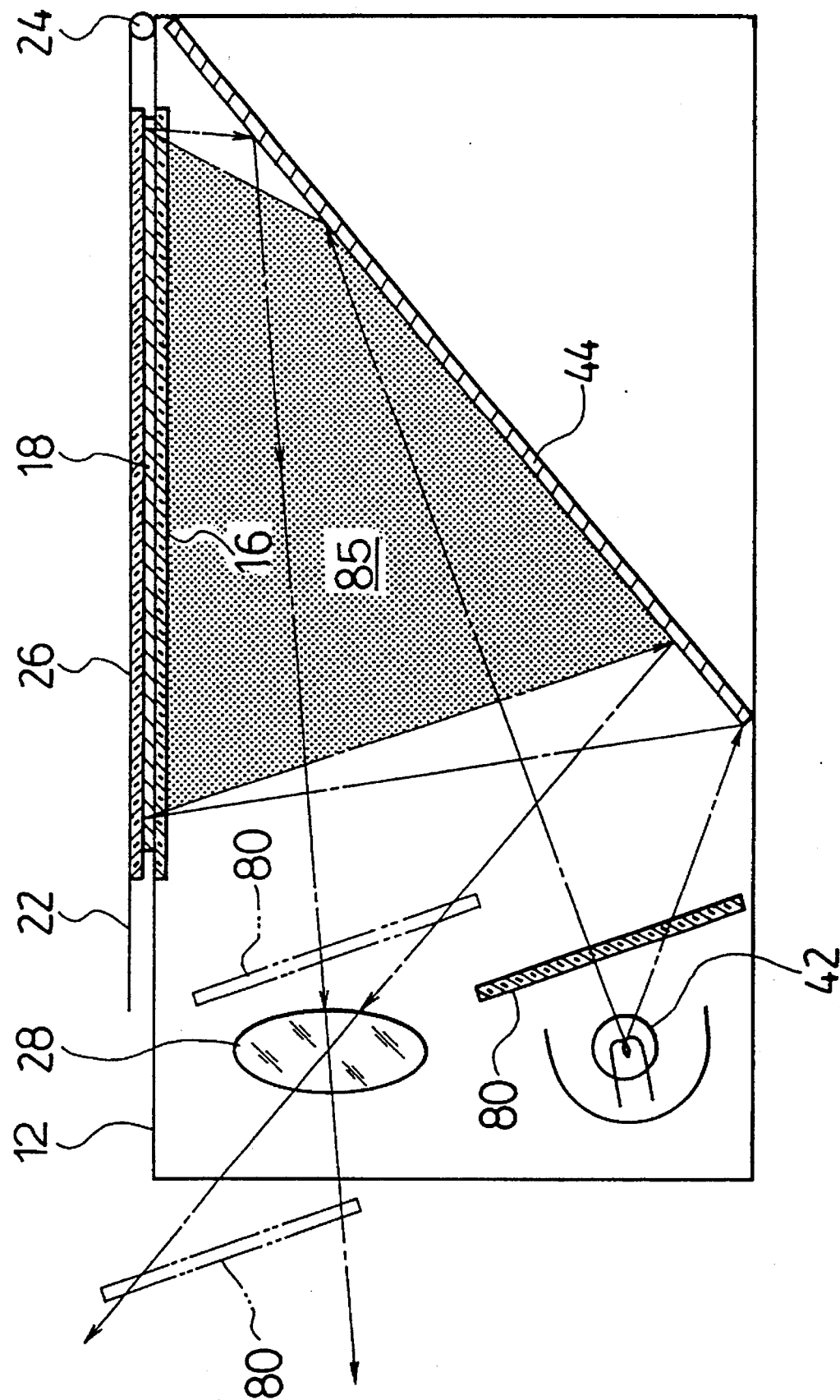
FIG. 8 is a sectional view of the reflection type projector illustrating the arrangement of a light-shielding plate.
Figure 9:
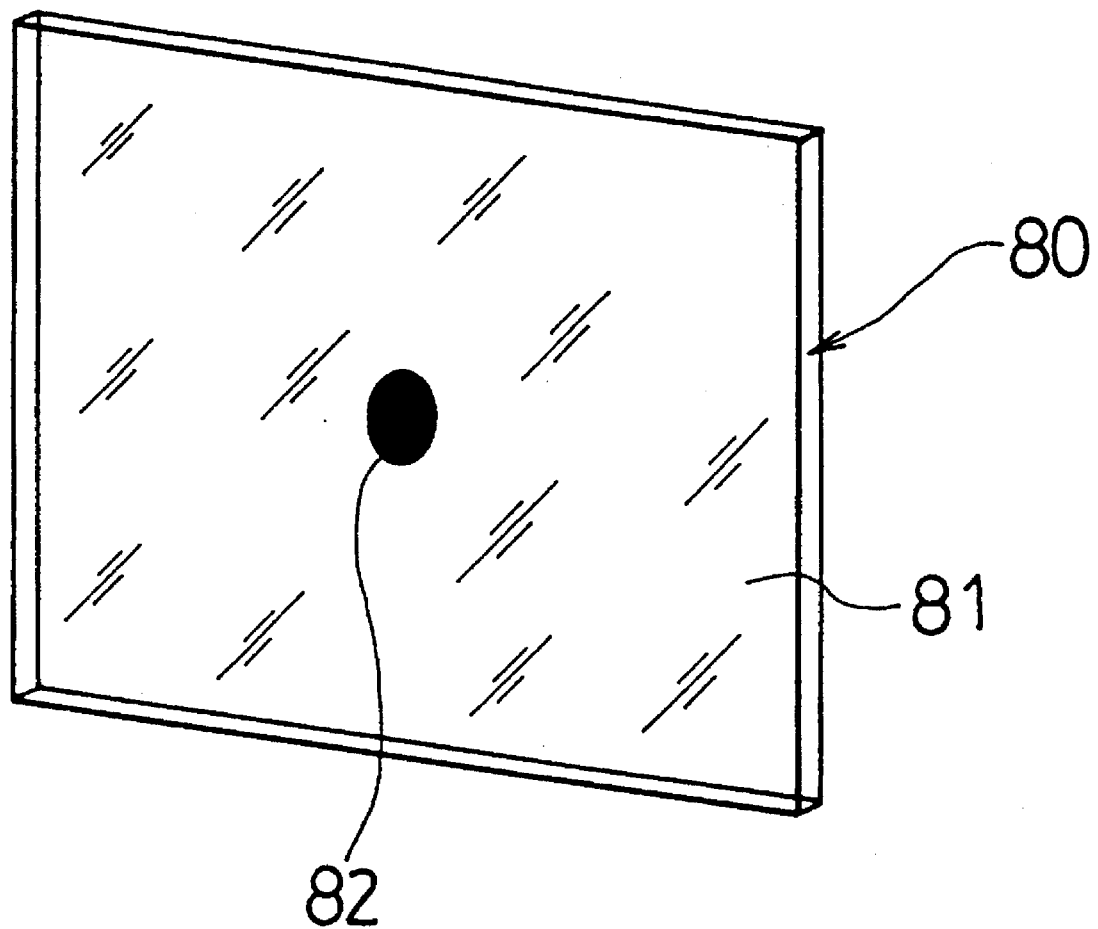
FIG. 9 is a perspective view illustrating an embodiment of the light-shielding plate.

FIG. 8 is a sectional view illustrating the fifth embodiment of the reflection type projector according to the present invention, and a light-shielding plate 80 is provided in front of the metal halide lamp 42. As shown in FIG. 9, in the light-shielding plate 80, a black light-shielding seal is put on the center part of a rectangular transparent plate 81. The light-shielding plate 80 is inclined by a predetermined angle and attached in such a manner that the light-shielding seal 82 is positioned on a light path of the metal halide lamp 42's image. As a result, the light of the metal halide lamp 42's image is shielded by the light-shielding seal 82, so the spot light can be eliminated.

Moreover, when the light-shielding plate 80 is arranged at a shadow area 85 (a position where the light from the metal halide lamp, which is reflected on the mirror 44, overlaps the light reflected on the reflection Fresnel lens 26) shown in FIG. 8, the shadow of the light-shielding seal 82 appears at two positions on the screen 38. Therefore, the light-shielding plate 80 can be arranged in front of the projection lens unit 28 and in front of the projection lens unit 28 outside the housing 12 as shown with a two-dot chain in FIG. 8, only if the light does not overlap each other. In the case that the light-shielding plate 80 is arranged outside the housing 12, the light-shielding plate 80 can be supported by the housing 12. And, the size and shape of the light-shielding seal 82 of the light-shielding plate 80 can be determined in accordance with the position where the light-shielding plate 80 is positioned and the shape of the spot light (the metal halide lamp 42).

By the way, the shutter plate 106 shown in FIG. 2 is arranged between the metal halide lamp 42 and the reflection mirror 44. An axis 108 is secured to the lower portion of the shutter plate 106, and the axis 108 is connected with the rotation axis of a direct-circuit motor 110 arranged at the bottom of the housing 12 in such a manner to transmit its rotational force. Accordingly, the shutter plate 106 rotates around the axis 108 by the driving force from the direct-current motor 110, and can move forward and backward against the optical axis 43 of the metal halide lamp 42. As a result, when the shutter plate 106 advances onto the optical axis 43 as shown with a two-dot chain in FIG. 2, it can cut off the light from the metal halide lamp 42 toward the transparent manuscript 18 can be cut off, and when the shutter plate 106 retracts from the optical axis 43 as shown with a line of FIG. 2, the light from the metal halide lamp 42 can travel toward the transparent manuscript 18.

In the rotational range of the shutter plate 106, a forward limit switch 112 and a backward limit switch 114 are arranged. When the shutter 106 advances onto the optical axis 43 of the metal halide lamp 42, the forward limit switch 112 is pushed by the shutter plate 106 to open a circuit. And, when the shutter plate 106 retracts from the optical axis 43 of the metal halide lamp 42, the backward limit switch 114 is pushed by the shutter plate 106 to open a circuit.

Figure 10:
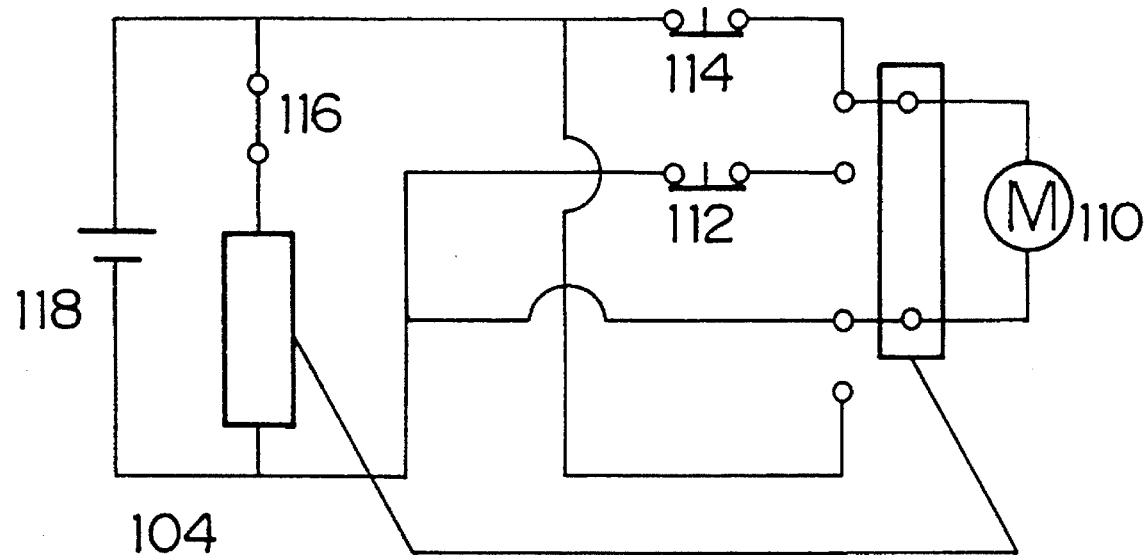
FIG. 10 is an explanatory view illustrating a drive circuit of a shutter plate in the case when the shutter plate retracts from an optical axis of the light from the metal halide lamp.

Next, an explanation will be given of the operation of the shutter plate 106 with reference to FIGS. 1, 2, and 10.

First, when the manuscript cover 22 is closed on the stage glass 16, the magnet 100 fixed on the manuscript cover 22 adsorbs with the magnetic plate 102 so that a lead relay 116 can work. As a result, the circuit is closed and a relay 104 works. With the manuscript cover 22 opened, the shutter plate 106 is located at a position shown with a two-dot chain of FIG. 2. That is, the backward limit switch 114 remains closed. Therefore, when the relay 104 works as mentioned above, a direct-current motor 110 is driven by a power source 118 through a point of contact of the forward limit switch 114 so as to rotate clockwise as shown in FIG. 2 (refer to FIG. 10). As a result, the shutter plate 106 rotates around the axis 108 clockwise from a position shown with a two-dot chain to a position shown with a line, and when reaching a position shown with a line, it pushes the backward limit switch 114. When the backward limit switch 114 is pushed, the circuit is opened and direct-current motor 110 stops working. Accordingly, the shutter plate 106 stops at a position where it retracts from the optical axis 43 of the metal halide lamp 42, so the light from the metal halide lamp 42 is not cut off by the shutter plate 106 and travels toward the transparent manuscript 18.

Next, when the manuscript cover 22 is opened for replacing the manuscript, the magnet 100 separates from the magnetic plate 102, so the lead relay 116 and the relay 104 do not work. The direct-current motor 110 is driven by the power source 118 through a point of contact of the backward limit switch 112 so as to rotate counterclockwise as shown in FIG. 2 (refer to FIG. 11). As a result, the shutter plate 106 rotates around the axis 108 counterclockwise from a position shown with a line to a position shown with a two-dot chain, and when reaching a position shown with a tow-dot chain, it pushes the forward limit switch 112. When the forward limit switch 112 is pushed, the circuit is opened and the direct-current motor 110 stops working. Accordingly, the shutter plate 106 stops on the optical axis 43 of the metal halide lamp 42, so the light from the metal halide lamp 42 is cut off by the shutter plate 106.

As has been described above, the light from the metal halide lamp 42 can be cut off without the need to electrically turn on/off the power source of the metal halide lamp 42 when the manuscript cover 22 is opened, and the transparent manuscript 18 is provided with the light from the metal halide lamp 42.

Therefore, in this embodiment, the metal halide lamp 42 can be used for a long period of time, and when the transparent manuscript 18 is replaced, there is no need to wait until the light amount of the metal halide lamp becomes stable.

Moreover, if a hole 106A is provided on the shutter plate 106 and a part of the light from the metal halide lamp 42 is transmitted through the hole 106A, the shutter plate 106 can be prevented from being heated by the light from the halide lamp 42. As mentioned above, in the reflection type projector according to the present invention, provided is the cutting means for cutting off the light band which is reflected before reaching the reflection Fresnel lens and enters the projection lens so that the light amount of the light band which causes the spot light can be reduced, as a result, the spot light appearing on the screen is inconspicuous.

And, according to the reflection type projector of the present invention is provided with the shutter member which mechanically cuts off the projection light from the light source, and the shutter member is advanced to and retracted from on the optical axis of the projection light by the sensor which detects whether the reflection Fresnel lens is opened or closed and the drive means, so that the projection light from the light source can be cut off without the need to electrically turn on/off the power source of the light source when the reflection Fresnel lens is opened, and the transparent manuscript can be illuminated when the reflection Fresnel lens is closed.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A reflection type projector which comprises a housing wherein an opening formed on its upper surface is covered with a light transmission plate and a stage surface is formed on which a transparent manuscript is placed, a reflection Fresnel lens which is provided in said housing in such a manner to overlap said light transmission plate and holds said transparent manuscript between said stage surface and itself, a projection lens provided on a side of said housing, a light source which is provided in said housing and illuminates said transparent manuscript, and a reflection mirror which is provided in said housing and reflects a projection light of the transparent manuscript illuminated by said light source toward said projection lens, comprising:

a shutter member which is provided in such a manner that it can move forward onto and retract from an optical axis of said light source and advances onto said optical axis, thereby cutting off a projection light given to said transparent manuscript by said light source;

detecting means which detects whether said reflection Fresnel lens is opened or closed; and, drive means which advances said shutter member onto the optical axis of the light source on the basis of an information from said detecting means that said reflection Fresnel lens is opened and retracts the shutter member from the optical axis of the light source on the basis of an information from said detecting means that said reflection Fresnel lens is closed.

2. A reflection type projector comprising a housing wherein an opening formed on its upper surface is covered with a light-transmission plate and a stage surface is formed on which a transparent manuscript is placed, a reflection Fresnel lens which is provided in said housing in such a manner to overlap said light-transmission plate and holds the transparent manuscript between said stage surface and itself, a projection lens provided on a side of said housing, a light source which is provided in said housing and illuminates said transparent manuscript, and a reflection mirror which is provided in said housing and reflects a projection light of the transparent manuscript illuminated by said light source toward said projection lens; comprising:

light band cutting means for cutting a light band which is reflected before reaching said reflection Fresnel lens and enters said projection lens among a light band from said light source.

3. The reflection type projector according to claim 2, wherein said light band cutting means is a reflection preventing film which coats a surface of said stage surface.

4. The reflection type projector according to claim 3, wherein said light band cutting means is a Fresnel surface which is formed to face a transparent manuscript side of said reflection Fresnel lens and is hard-coated.

5. The reflection type projector according to claim 3, wherein said cutting means is a Fresnel surface which is formed on a surface of a transparent manuscript side of said reflection Fresnel lens and is covered with a protective glass whose surface of the transparent manuscript side is coated with a reflection preventing film.

6. The reflection type projector according to claim 3, wherein said cutting means is a Fresnel lens on which a Fresnel surface is formed on a surface opposite to a transparent manuscript of said reflection Fresnel lens.

7. The reflection type projector according to claim 6, wherein a reflection preventing film coats a surface of a transparent manuscript side of said reflection Fresnel lens.

8. The reflection type projector according to claim 2, wherein said light band cutting means is an irregular portion which is formed on a center part of a backside of said stage surface.

9. The reflection type projector according to claim 2, wherein said cutting means is a light-shielding member which is provided at a position where a light band from said light source does not overlap and shields the light band which is reflected before reaching said reflection Fresnel lens and enters said projection lens.

10. A reflection type projector which comprises a housing wherein an opening formed on its upper surface is covered with a light-transmission plate and a stage surface is formed on which a transparent manuscript is placed, a reflection Fresnel lens which is provided in said housing in such a manner to overlap said light transmission plate and holds said transparent manuscript between said stage surface and itself, a projection lens provided on a side of said housing, a light source which is provided in said housing and illuminates said transparent manuscript, and a reflection mirror which is provided in said housing and reflects a projection light of the transparent manuscript illuminated by said light source toward said projection lens; comprising:

cutting means for cutting off a central part of a light band which travels from said light source toward said reflection mirror.

11. The reflection type projector according to claim 10, wherein said cutting means is a light-shielding member which is provided close to the light source between said light source and said reflection mirror.

* * * * *